United States Patent
Bates, III

(10) Patent No.: US 7,086,785 B1
(45) Date of Patent: Aug. 8, 2006

(54) OPTICAL FIBER CARTRIDGE WITH EASILY INSTALLED BODY

(75) Inventor: Charles Linsday Bates, III, Laguna Hills, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/340,042

(22) Filed: Jan. 26, 2006

(51) Int. Cl.
*G02B 6/36* (2006.01)

(52) U.S. Cl. .......................................... 385/78; 385/76

(58) Field of Classification Search ................... 385/60, 385/75–78, 88, 92, 147
See application file for complete search history.

(56) References Cited

U.S. PATENT DOCUMENTS

| | | | | |
|---|---|---|---|---|
| 5,796,898 A | * | 8/1998 | Lee | 385/78 |
| 6,655,851 B1 | * | 12/2003 | Lee | 385/78 |
| 6,883,974 B1 | * | 4/2005 | Bates et al. | 385/76 |

* cited by examiner

*Primary Examiner*—Phan Palmer
(74) *Attorney, Agent, or Firm*—Peter Van Winkle

(57) ABSTRACT

A self-contained fiber optic cartridge (300) includes a body (310) with a bore (342) that receives a fiber optic cable (30) and which is then bonded by epoxy (340) to the cable, with the body then installed in a passage (343) of a frame (304). The body has a rear part that forms fingers (314) with flanges (324) that are inwardly compressed during rearward (R) insertion and then spring out to abut a rearwardly-facing shoulder (326) of the frame, to prevent the body from falling forwardly (F) out of the frame.

3 Claims, 3 Drawing Sheets

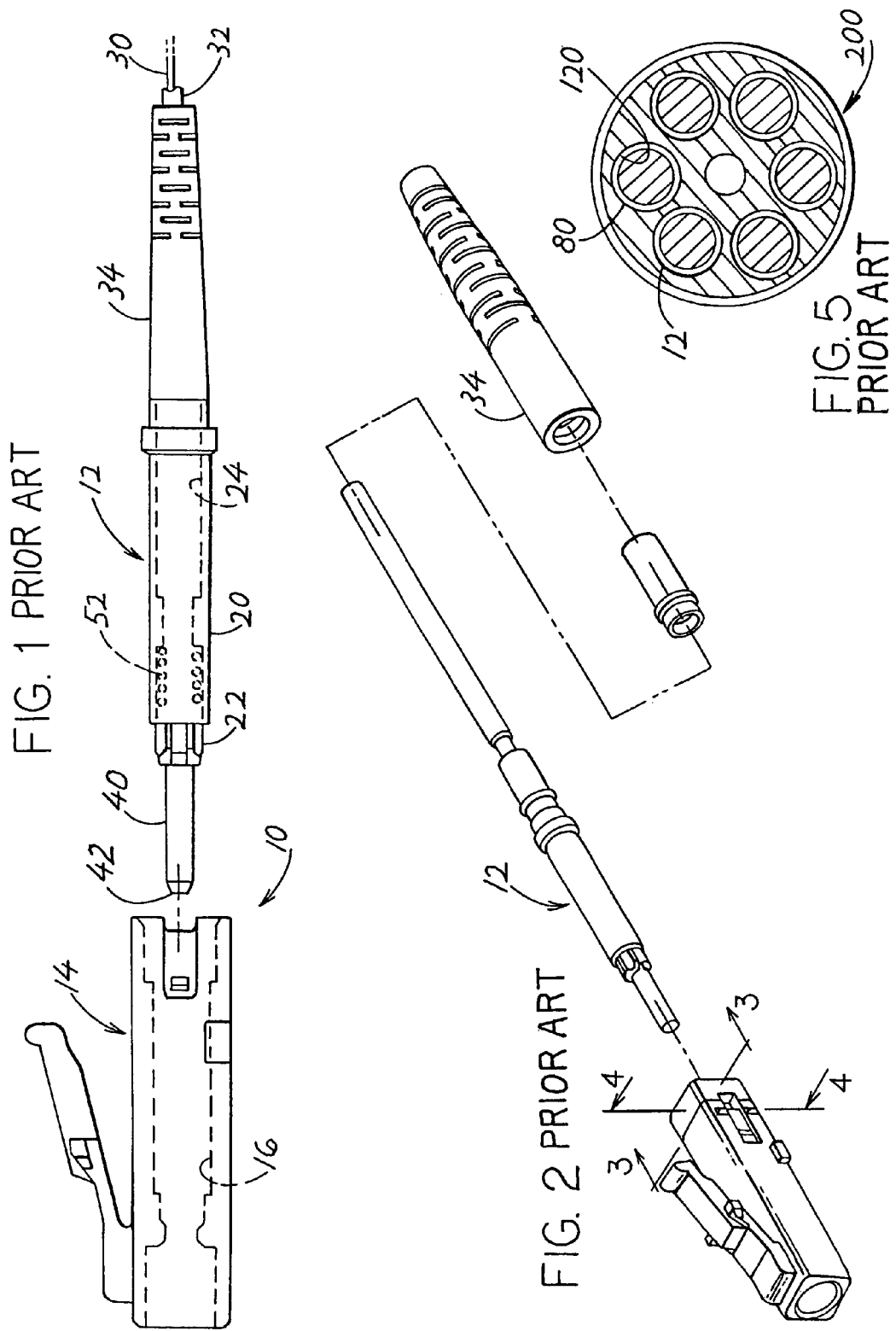

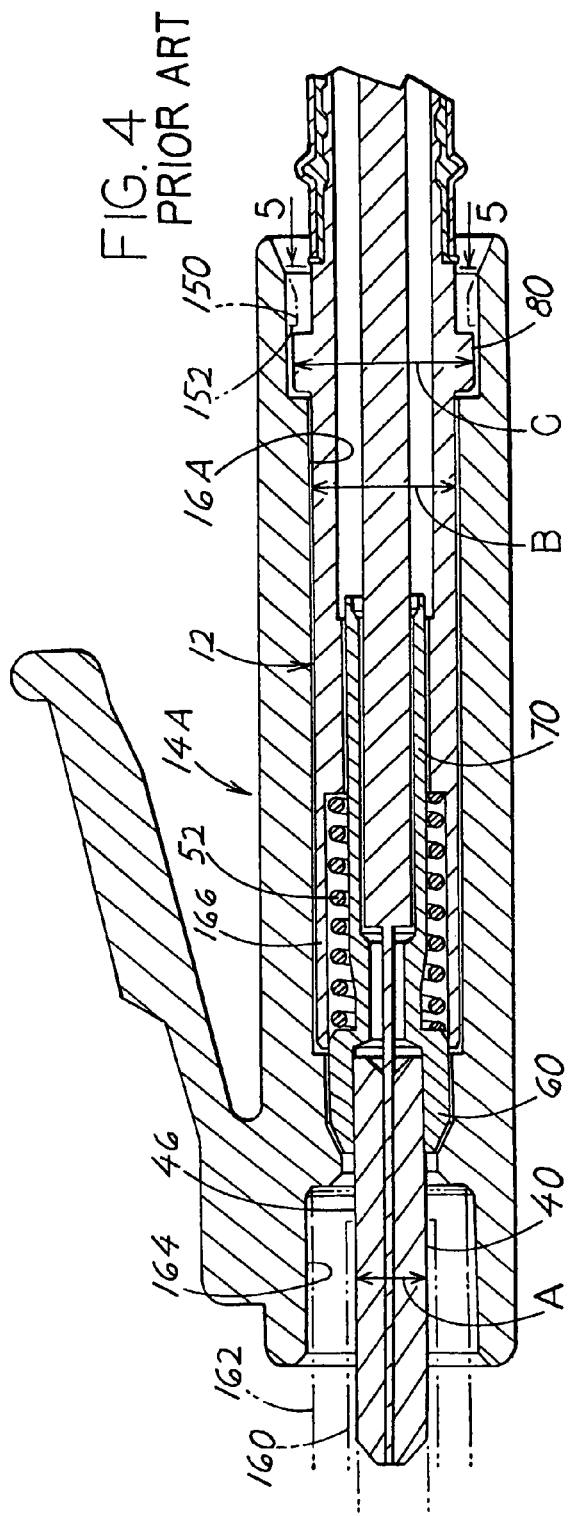
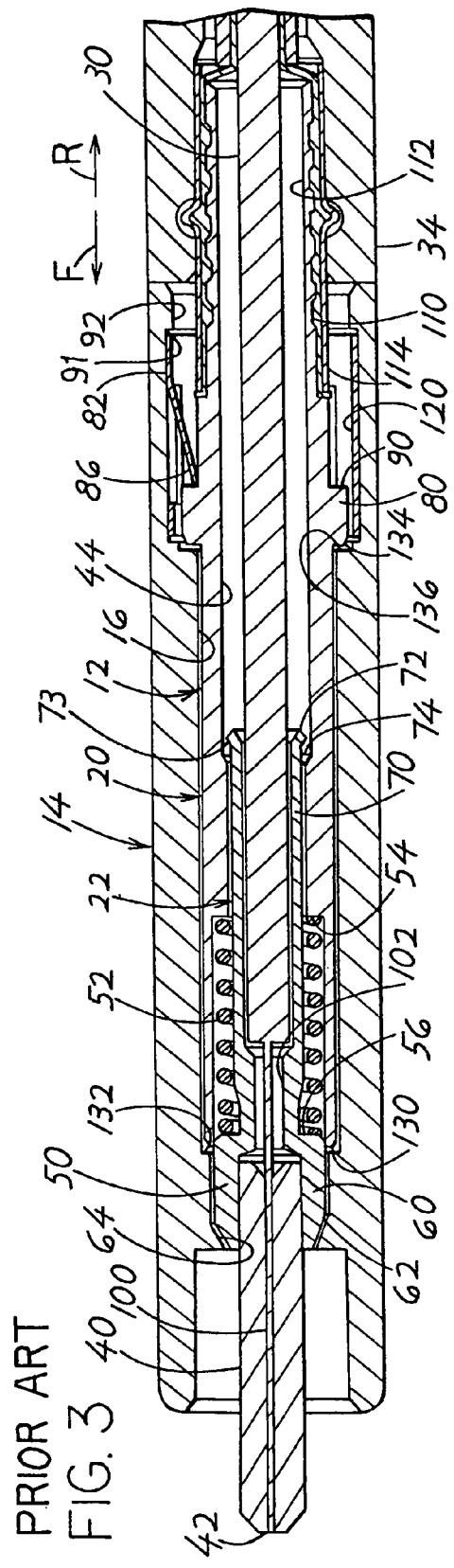

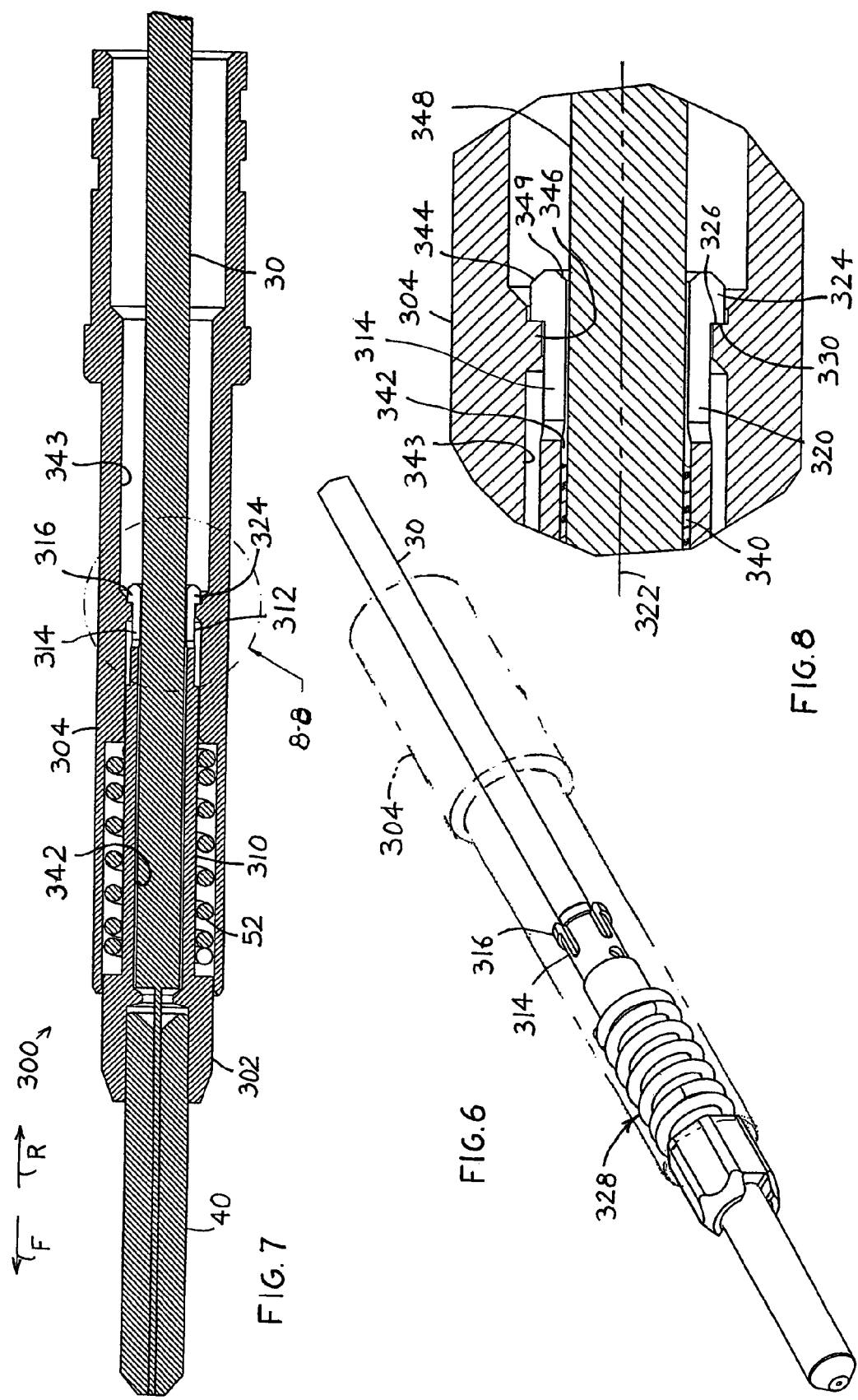

OPTICAL FIBER CARTRIDGE WITH EASILY INSTALLED BODY

BACKGROUND OF THE INVENTION

Our U.S. Pat. No. 6,883,974 describes a self-contained small-diameter fiber optic cartridge with a protected coil spring. The coil spring biases a body forwardly within a frame. The body is inserted rearwardly into the cartridge frame and the body is prevented from falling out by swaging the rear of the sleeve-shaped body to expand it to form a shoulder that abuts a frame shoulder.

Swaging of the body rear end requires that the body be empty during swaging. After such swaging, a fiber optic cable is inserted forwardly into the body bore, and epoxy is introduced into the body bore to fix the cable in the body. It is difficult to insert epoxy into the body bore when the body lies in the frame. If epoxy gets on the spring or frame, it can interfere with cartridge operation. A cartridge that allowed the cable to be installed in the body bore and epoxied in place, prior to the body being inserted rearwardly into the frame and then latched against forward movement out of the frame, would be of value.

SUMMARY OF THE INVENTION

In accordance with one embodiment of the present invention, a fiber optic cartridge and assembly method are provided, which enables the fiber optic cable to be installed and latched in place and bonded in the bore of the body before the body is installed in a passage of the frame. The frame has a rearwardly-facing shoulder. The sleeve-shaped body has a rear part with slots that form a plurality of fingers with outwardly-projecting finger flanges. When the body with the cable bonded therein, is slid rearwardly deep into the frame passage, the fingers are deflected radially inward until the flanges pass the frame shoulder. The fingers then snap outward, and forwardly-facing shoulders on the finger flanges abut the frame shoulder.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded side elevation view of a connector housing and of a fiber optic cartridge of the prior art.

FIG. 2 is an exploded front isometric view of the housing and cartridge of FIG. 1.

FIG. 3 is a sectional view taken on line 3—3 of FIG. 2.

FIG. 4 is a sectional view taken on line 4—4 of FIG. 2, but showing a modified retainer at the rear of the housing, and with the retainer body rear end not yet swaged.

FIG. 5 is a sectional view of a connector with multiple passageways that each holds a cartridge of the design as taken on line 5—5 of FIG. 4.

FIG. 6 is a front isometric view of a fiber optic cartridge of the present invention, with the frame shown in phantom lines.

FIG. 7 is a sectional side view of the cartridge of FIG. 6.

FIG. 8 is an enlarged view of area 8—8 of FIG. 7.

DESCRIPTION OF THE PREFERRED EMBODIMENTS

FIGS. 1 and 2 illustrate a connector 10 which includes a fiber optic cartridge 12 and a housing 14 with a passageway 16 that receives the cartridge. The cartridge includes a frame 20 and a terminus 22 that extends through a through passage 24 of the frame. An optic fiber cable 30 extends through a bend limiting sleeve 32 and through a bendable coupling 34, and through the terminus to a tip 42 of a ferrule 40 of the terminus.

FIG. 3 shows that the terminus 22 includes a body 50 that holds the rear end of the ferrule 40, preferably in a press fit, and that has a bore 44 with a narrow middle 102 and a wider rear portion that holds the cable. A spring 52 has a rear end that abuts a largely forwardly-facing internal shoulder 54 of the frame 20 and that has a front end that abuts an external largely rearwardly-facing shoulder 56 on the terminus body. The terminus body has an enlarged front portion 60 with a front end forming a largely forwardly-facing shoulder 62 that abuts a largely rearwardly-facing internal shoulder 64 on the housing 14. FIG. 3 shows the terminus in its most forward position, wherein the entire spring 52 is protected by the frame 20. The body has a narrow rear portion 70 with a rear end 72 that is swaged, to form an external flange shoulder 73 that is in line with an internal frame shoulder 74 to limit forward movement of the terminus within the frame 20 and prevent substantial exposure of the spring 52, and to prevent the ferrule from falling out of the frame.

The frame 20 has an external flange 80 near its rear end, which is used in conjunction with a retainer 82 to releasably hold the cartridge 12 in the housing passageway 16. It is possible to merely form a groove where the flange 80 lies, to provide a shoulder. The particular retainer 82 is in the form of a sheet metal clip with tines 86 that abut a largely rearwardly-facing shoulder 90 of the frame. A rear end of the clip abuts a forwardly facing and clip-retaining housing rear shoulder 91. A tool can be inserted into the rear 92 of the housing passageway 16 (by first pulling the coupling 34 rearward) to expand the tines 86 and withdraw the cartridge 12 from the housing passageway. Such tool does not slide across the spring 52 or against any part of the terminus, so it cannot damage the spring or terminus. As mentioned above, when the cartridge 12 lies outside of the housing, the spring is protected. Since the spring 52 is a permanent part of the cartridge, no clip is required to remove the terminus from the frame of the cartridge.

The cartridge is assembled by pressing the ferrule 40 rearwardly into the front portion 60 of the body. The spring 52 is slid forwardly F against the body shoulder 56. The terminus, with the spring 52 thereon, is then slid rearwardly R into the front end of the through passage 44 of the frame 20. The rear end 72 of the terminus body is swaged to enlarge it so that it can abut the shoulder 74 of the frame to prevent the terminus from moving forwardly from the position shown in FIG. 3.

The optic fiber cable 30 is prepared by stripping protective material from around the front portion of the glass fiber 100. The cable is inserted forwardly through the body rear portion 70 and through a bore 102, with the stripped fiber 100 inserted through the ferrule 40 until the tip of the ferrule tip 42. The fiber tip is polished flush with the ferrule tip. Then, flowable epoxy is flowed into the narrow space between the outside of the cable and the inside of the body to fill this space with epoxy, to bond the cable to the body. Care must be taken to dispense the proper amount of epoxy, to fill most of the body passage without overflowing epoxy rearward of the body rear end 72. Such overflow could bond the body to the frame 20 or even to the spring and prevent proper operation of the cartridge. Too little epoxy would risk the possibility that the cable could be pulled out of the cartridge.

It would be desirable if the optic fiber cable could be installed in the body and bonded in place, before the body 50 was installed in the frame 20. FIGS. 6–8 illustrate a cartridge 300 that enables the fiber optic cable 30 to be installed in the body 302 and to be bonded by epoxy in the body, before the body is installed in a frame 304. This is made possible by constructing the body rear portion 310 with a rear part 312 that has fingers 314 with rear ends 316 that are radially deflectable.

The body rear part 312 has a plurality of slots 320 extending forwardly into the rear edge of the body to form the fingers 314. As shown in FIG. 8, each finger has a radially (with respect to body axis 322) outwardly extending flange or projection 324 that forms a rearwardly-facing shoulder 330. Each finger shoulder abuts a forwardly facing shoulder 326 on the frame.

When the terminus is assembled so the spring 52 and ferrule 40 are installed in the body 302 to form a terminus 328, the fiber optic cable 30 is installed in the terminus bonding agent such as epoxy 340 (FIG. 8) is or has been installed in the space between the cable 30 and the walls of the body bore 342. The terminus is then installed in the passage 343 in the frame 304. Since the epoxy rear end 345 does not lie within the fingers but only forward of the fingers 314, the fingers will deflect radially inward as bevelled tips 344 of the fingers encounter an internal flange 346 of the frame. The cable has a deflectable jacket 348 that can be readily depressed by the finger rear ends. The finger rear ends have bevelled inner ends 349 to facilitate movement along the cable jacket. When the fingers snap outward their inside surfaces do not project into the cable jacket. With further rearward movement of the terminus, the finger projections snap radially outward so rearwardly-facing finger shoulders 350 abut forwardly facing flange shoulder 352. The body is then latched in the frame, in that the body can be removed forwardly only by taking special measures to deflect the fingers radially inwardly while moving the body forwardly.

After the terminus 328 of FIG. 6 has been installed in the frame 304 on the terminus 22 of FIG. 3 has been installed in its frame 20, the trailing portion of the fiber optic cable is finished. The bendable coupling 34 is moved forward, the strength member 110 of the optic fiber cable is wrapped around a rear portion 112 of the frame, and a crimp sleeve 114 is crimped around them.

In FIG. 3, the body is formed with an elongated undercut recess 120 for receiving the clip retainer 82. The cartridge 12 is installed by merely inserting it forwardly into and through the housing passageway 16. Forward movement of the frame is limited by the frame front end 130 abutting a corresponding internal shoulder 132 of the housing. Also, a rear flange front end 134 abuts a housing internal shoulder 136 which also limits forward movement of the cartridge within the housing.

FIG. 4 illustrates a modified housing 14A that is identical to that of FIG. 3, except that the housing has interfering parts 150 on opposite sides of the housing passageway 16A, that deflect apart to allow the frame external flange 80 to pass therethrough, and which have largely forwardly-facing shoulders 152 that then prevent cartridge removal unless the interference parts 150 are spread apart. A variety of retainers can be used to hold the optic fiber cartridge 12 in place and allow its removal when necessary. The presence of the flange 80 facilitates operations of such releasably retainers.

The cartridges 12 and 300 each has a relatively small diameter C and corresponding parts have the same dimensions. The ferrule 40 is required to have a predetermined diameter A to fit into a standard diameter alignment sleeve 160 that is contained in an alignment cartridge 162 that fits into a recess 164 at the front end of the housing. The terminus body front portion 60 must have a somewhat larger diameter than the ferrule to robustly hold the rear end of the ferrule 40. The frame front end 166 can be thin and have only a slightly greater diameter than the terminus body front portion 60. The body rear portion 70 has a small diameter, so the spring 52 can readily fit between the inside of the frame front portion 166 and the outside of the body rear portion 70. This results in a cartridge of small diameter, with the flange 80 at the rear adding only a small addition diameter. In FIG. 4, the ferrule has a standard outside diameter A of 1.6 mm, the cartridge 12 has an outside diameter B of 3.3 mm (about 190% of A) along most of its length, and the flange 80 has an outside diameter C of 3.9 mm (about 240% of A). Where the housing holds a single terminus, this results in the cartridge being installable in a housing of small size. Where the housing has multiple passageways, the small diameter of each cartridge enables the multiple passageways of such connector to be closely spaced so that a large number of termini can be installed in a connector of small size. The fact that the body front portion 60 projects partially forward of the frame front end 130, results in a connector of smaller length.

FIG. 5 illustrates a connector 200 with six optic fiber cartridges 12 installed therein. A prior art installation, which included a releasably retention clip that engaged the terminus body and a spring with space for a release tool to fit around or within the spring, might allow only five termini to be placed in a connector of the same diameter.

Thus, the invention provides a fiber optic cartridge that is self-contained, and wherein the fiber optic cable can be installed in the body bore and bonded in place prior to the body being inserted rearwardly into the frame passage and latched in place. The body has a rear part forming a plurality of fingers with free rear ends that have radially outwardly extending projections with forwardly-facing shoulders. The frame has a forwardly-facing shoulder. When the body is slid rearwardly into the frame, the fingers are radially inwardly compressed until their projections spring outward and the shoulders on the projections lie against the forwardly-facing shoulder on the frame to latch the body in the frame. Epoxy or other flowable bonding material is established in the body bore and around the cable, but the mass of bonding material terminates forward of the fingers. The frame forwardly-facing shoulder is preferably formed on an internal flange in the frame passage. The finger outer surfaces up to the projections, are recessed from more forward parts of the fingers.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A self-contained fiber optic cartridge which includes a frame having a through passage, a coil spring lying in said passage and having a rear end abutting said frame, a terminus which includes a body that extends through said spring and that has a shoulder that abuts a front end of said spring and that has bore walls that form a through bore, said terminus also including a ferrule at a front end of the body, and including a fiber optic cable that extends through said bore in said body and through said ferrule, wherein:

said frame has a rearwardly-facing shoulder lying rearward of said spring;

said body has a rear part with a rear edge and a plurality of slots extending into said rear edge to form a plurality of fingers, said fingers having outwardly-projecting flanges at their rear ends that form forwardly-facing shoulders that abut said frame rearwardly-facing shoulder; and including a quantity of bonding material that bonds said cable to the walls of said body bore, said quantity of bonding material having a rear end that lies forward of said fingers, to thereby enable the cable to be bonded in the body bore and thereafter allow the body to be inserted rearward into the frame passage and then cause the body to hold itself against forward movement out of the frame.

2. The cartridge described in claim 1 wherein:

said body has a rear portion with a front part of a first outside diameter, that extends through and rearward of the spring, said body rear portion having a rear part that includes said fingers, said rear part having a smaller outside diameter than said first diameter, up to said flanges;

said frame passage forms as internal flange with a rear end forming said rearwardly-facing shoulder and with a front end lying rearward of said front part of said body rear portion.

3. A method for constructing a fiber optic cartridge to hold an optic fiber cable, comprising:

inserting the cable forwardly through a bore in a body of the cartridge, and flowing a bonding material that hardens into said bore and allowing said bonding material to bond to said bore and cable along said bore;

inserting a spring rearwardly into a passage of a frame of a terminus of the cartridge until the spring abuts a forwardly facing shoulder of the frame, and inserting said body into the passage;

said step of inserting said body rearwardly into said passage includes deflecting each of a plurality of fingers formed at a rear end of the body, radially inwardly while the fingers move at least part of the length of said bore, and then allowing said fingers to spring radially apart so radially outwardly extending flanges at rear ends of said fingers snap behind a forwardly-facing shoulder of said frame to thereafter to prevent the body from falling forwardly out of the frame passage.

* * * * *